United States Patent
Green et al.

[15] 3,669,195
[45] June 13, 1972

[54] FOLDING IMPLEMENT CARRIER

[72] Inventors: Edgar E. Green; Phillip H. Nuckols, both of Blytheville, Ark.

[73] Assignee: Paul Abbott Company, Inc., Blytheville, Ark.

[22] Filed: April 3, 1970

[21] Appl. No.: 25,484

[52] U.S. Cl. ........................... 172/311, 172/126, 172/446, 172/456, 172/568, 172/667
[51] Int. Cl. ........................................................ A01b 65/02
[58] Field of Search .................. 172/310–311, 446, 172/448, 451, 456, 568, 126, 132; 280/34 A, 34 R, 411–413

[56] References Cited

UNITED STATES PATENTS

| | | | |
|---|---|---|---|
| 2,972,385 | 2/1961 | Walberg | 172/456 |
| 2,990,893 | 7/1961 | Bland | 172/456 |
| 3,362,484 | 1/1968 | Walberg | 172/568 |
| 3,088,526 | 5/1963 | Swenson | 172/456 |
| 3,102,598 | 9/1963 | Mighell | 172/568 |
| 3,520,373 | 7/1970 | Stinemetz | 172/311 |
| 3,255,830 | 6/1966 | Groenke | 172/456 |
| 3,542,138 | 11/1970 | Fackler et al. | 172/311 |
| 3,511,316 | 5/1970 | Oerman et al. | 172/126 |
| 3,162,459 | 12/1964 | Marmorine et al. | 280/413 |
| 3,123,153 | 3/1964 | Morkoski et al. | 172/568 |
| 3,410,234 | 11/1968 | Peifer | 172/456 |
| 3,521,906 | 7/1970 | Parker | 172/311 |
| 3,523,699 | 8/1970 | Sinkule et al. | 172/311 |
| 3,529,674 | 9/1970 | Todd et al. | 172/311 |
| 3,275,341 | 9/1966 | Ralston | 172/451 |
| 3,077,231 | 2/1963 | Hamilton | 172/451 |
| 3,403,737 | 10/1968 | Byrd | 172/451 |
| 3,250,333 | 5/1966 | Day | 172/126 |
| 3,524,508 | 8/1970 | West | 172/126 |

*Primary Examiner*—Robert E. Pulfrey
*Assistant Examiner*—C. W. Hanor
*Attorney*—A. Yates Dowell and A. Yates Dowell, Jr.

[57] ABSTRACT

Apparatus having fixed and movable portions for supporting a plurality of earth-working implements with such apparatus extending substantially beyond the sides of a propelling vehicle when in use and folded to inoperative position when not in use as well as while travelling and maneuvering. The movable portions of the apparatus are pivotally supported a substantial distance from the ends of the fixed portion and the fixed and movable portions are generally co-extensive in operative position.

3 Claims, 10 Drawing Figures

INVENTORS
EDGAR E. GREEN and
PHILLIP H. NUCKOLS
BY
ATTORNEYS

INVENTORS
EDGAR E. GREEN and
PHILLIP H. NUCKOLS

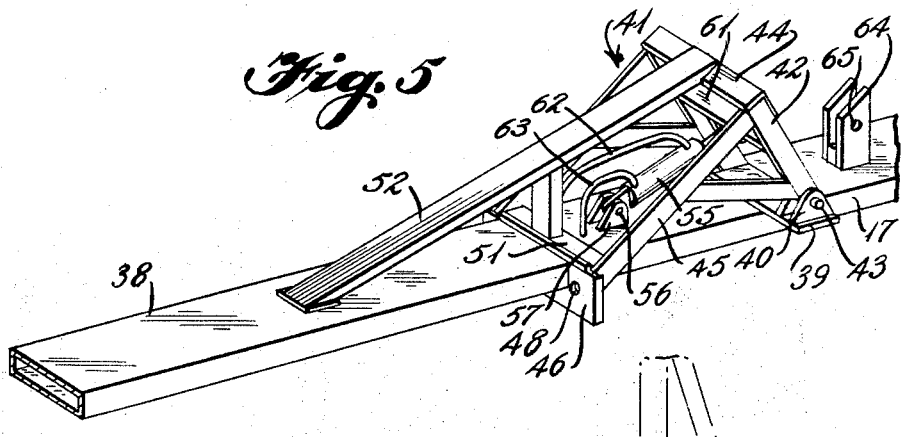
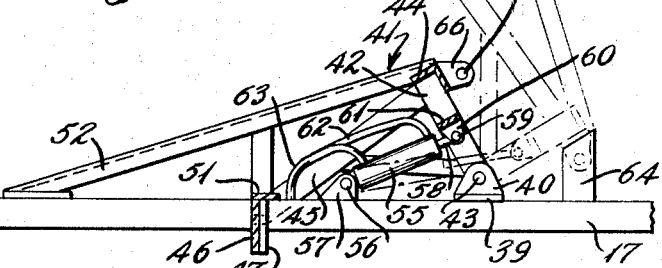
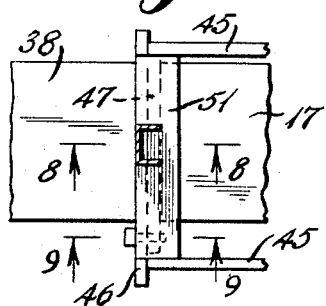
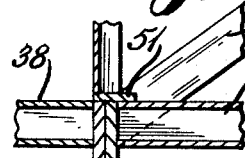
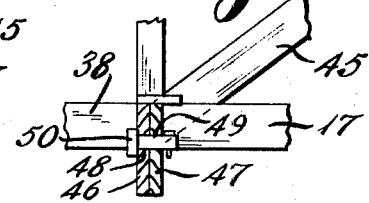
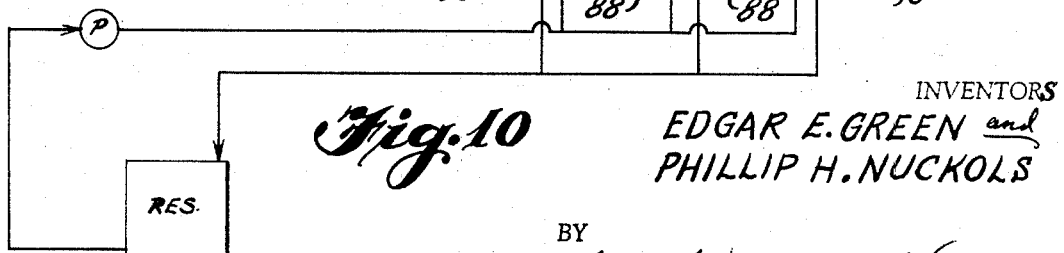
INVENTORS
EDGAR E. GREEN and
PHILLIP H. NUCKOLS
BY
ATTORNEYS 3,669,195

FOLDING IMPLEMENT CARRIER

BACKGROUND OF THE INVENTION

1. Field of the Invention.

This invention relates generally to earth-working implements of various kinds and relates particularly to a tool bar or carrier for earth-working implements which can be connected to a propelling vehicle and can be folded to an inoperative position when not in use.

2. Description of the Prior Art.

Heretofore implement carriers have been provided for connection to a propelling vehicle and some of such carriers have had folding portions which extended beyond the limits of the vehicle when in operation and could be moved to an inoperative position when not in use or during road travel and maneuvering. These prior art devices have not been satisfactory due primarily to the fact that the movable portion has been hinged to the fixed portion at the joint between such portions so that when the movable portions were raised to a substantially vertical position, tools carried thereby extended outwardly one above the other and the actual amount of clearance was not significantly reduced. Also since the hinge was at the connection, such hinge was subjected to a twisting action and shear forces when the device was in operation.

SUMMARY OF THE INVENTION

The present invention is a folding implement carrier including a main frame mounted on a propelling vehicle and having a tool bar connected thereto on which a plurality of earth-working implements are supported. The main frame has an auxiliary frame ame hingedly connected to either or both ends of the main frame in a position remote from the end of the main frame and in which the adjacent ends of the main and auxiliary frames are in abutting relationship with each other in operative position, and the auxiliary frame will be spaced inwardly of the outer ends of the main frame when such auxiliary frame is raised to inoperative position.

It is an object of the invention to provide a folding implement carrier having fixed and movable portions with the movable portion being hingedly mounted to the fixed portion in a position remote from the end thereof and with the fixed and movable portions being generally co-extensive and in abutting relationship when in operative position.

BRIEF DESCRIPTION OF THE DRAWINGS

FIG. 1 is a rear elevation showing one application of the invention.

FIG. 2 is a top plan view thereof.

FIG. 5 is an enlarged fragmentary perspective of the auxiliary frame-lifting mechanism.

FIG. 6 is a side elevation thereof.

FIG. 7 is an enlarged fragmentary section on the line 7—7 of FIG. 1.

FIG. 8 is a section on the line 8—8 of FIG. 7.

FIG. 9 is a section on the line 9—9 of FIG. 7.

FIG. 10 is a schematic diagram of the hydraulic system of the apparatus.

DESCRIPTION OF THE PREFERRED EMBODIMENT

Figure 3:
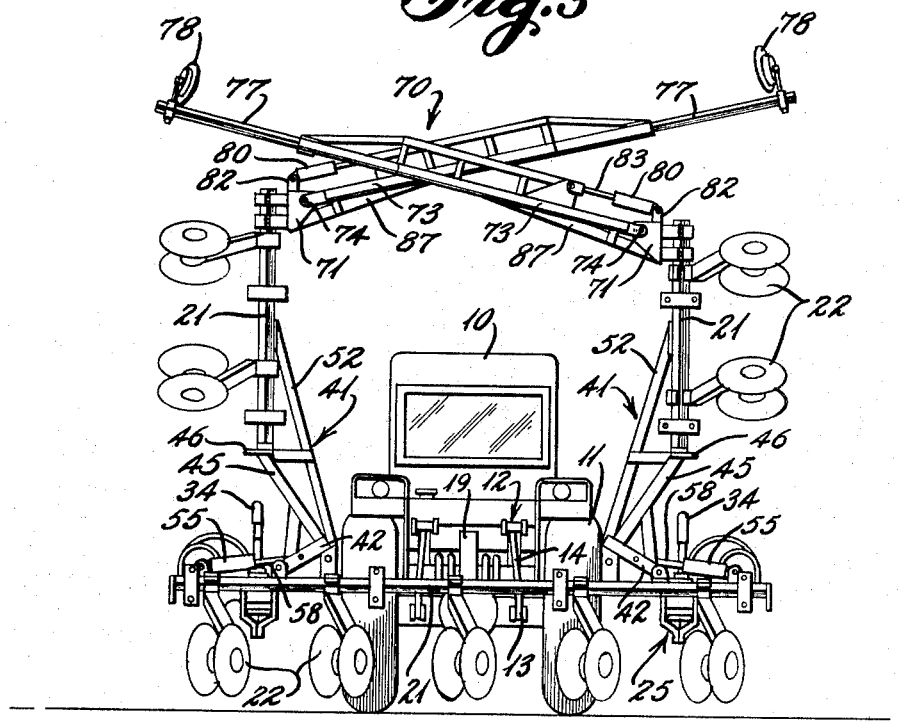
FIG. 3 is a rear elevation showing the parts in raised inoperative position.

With continued reference to the drawings, a propelling vehicle 10 is provided having ground-engaging wheels 11 and a conventional three-point or mast-type hitch 12. The hitch includes a pair of draft arms 13 of conventional construction having one end pivotally connected to the frame of the vehicle 10 and connected intermediate their ends to lift arms 14 for raising and lowering the draft arms. The draft arms 13 are generally parallel with each other and form two points of a three-point hitch, and the third point of such hitch is an adjustable bar 15 having one end pivotally mounted on the frame of the vehicle 10 at a higher elevation than the draft arms 13. The construction of the vehicle and the mast-type hitch are conventional in the art and form no part of the present invention.

The folding implement carrier of the present invention includes a main frame 17 having spaced connecting means 18 mounted on the front of the main frame and providing a connection to the ends of the draft arms 13. An upstanding member or A-frame 19 is carried by the main frame and such upstanding member is provided with means for pivotally receiving the other end of the adjustable bar 15 so that the mast-type hitch is pivotally connected to the main frame 17. The main frame is provided with a plurality of rearwardly extending mounting brackets 20 on which a tool bar 21 is clamped or otherwise attached, and such tool bar is adapted to support a plurality of earth-working implements 22 such as cultivators, seeders, planters, disk bedders, and the like.

Figure 4:
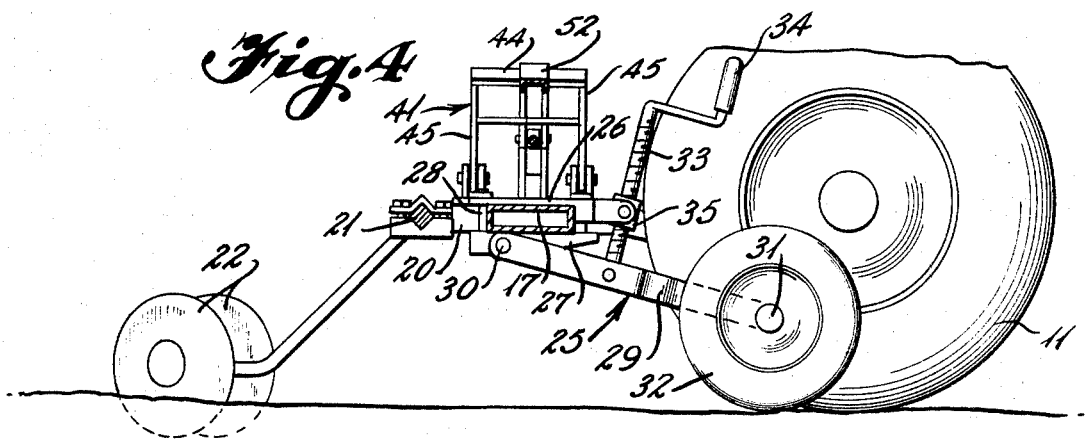
FIG. 4 is an enlarged section showing the mounting details of the gauge wheel.

Adjacent each end of the main frame 17 is mounted a gauge wheel assembly 25 (FIG. 4) which includes upper and lower clamp members 26 and 27 connected together by bolts or other fasteners 28 and which clamp members engage the main frame 17. As illustrated, the gauge wheel assembly 25 includes a yoke 29 pivotally mounted by a pin 30 to the lower clamp member 27 at one end of the yoke and the opposite end of such yoke is provided with an axle 31 on which a depth gauge wheel 32 is mounted. During normal operation of the device, the gauge wheel assembly 25 regulates the position of the main frame 17 above the earth. In order to adjust the gauge wheel to regulate the height of the main frame, a crank 33 having an operating handle 34 is threadedly connected to a pivoted nut 35 swingably mounted on the upper clamp member 26. The lower end of the crank 33 is rotatably connected to the yoke 29 intermediate the ends thereof so that rotation of such crank will raise and lower the gauge wheel 32 relative to the main frame 17.

The main frame 17 normally is limited in length to approximately four rows of crops to facilitate movement of the implements from one location to another and so that the implements can be transported on public roadways as well as pass through gates between adjacent fields. In order to extend the effective length of the frame to accommodate up to twelve rows, at lease one auxiliary frame 38 is mounted on the main frame in a position to extend outwardly of and form a continuation of the main frame. The auxiliary frame can be disposed at either or both ends of the main frame. However, as illustrated a pair of auxiliary frames are provided with one frame being disposed at each end of the main frame. Since the auxiliary frames are substantially mirror images of each other, only one auxiliary frame will be described.

A plurality of mounting brackets 20 are carried by the auxiliary frame 38 and such mounting brackets are adapted to support a tool bar 21 on which implements 22 are mounted in the same manner as the implements carried by the frame 17. In order to mount the auxiliary frame 38 on the main frame 17, a base plate 39 is welded or otherwise secured to the upper surface of the main frame 17 in spaced relation to the end of the main frame, and such base plate is provided with a pair of upstanding lugs 40 at each end. A bridge 41 is provided having a first pair of spaced generally parallel arms 42 with one end of each of such arms being pivotally connected by a pin 43 to the lugs 40 and the opposite ends of such arms being connected together by a cross member 44.

A second pair of spaced generally parallel arms 45 are connected to the other end of the first pair of arms adjacent to the cross member 44, and such second arms extend downwardly to a position adjacent and straddling the main frame 17. The ends of the second arms adjacent to the main frame are connected by a generally vertical cross plate 46 which is adapted to abut the end plate 47 of the main frame 17 and forms one end of auxiliary frame 38. Preferably the forward arm 45 is in abutting engagement with the end of the plate 47 when the frames are co-extensive to relieve any twisting or shear forces on the pins 43.

The cross plate 46 and the end plate 47 may be provided with openings 48 and 49, respectively, in alignment with each other and adapted to receive a pin 50 to lock the main and auxiliary frames together when such frames are in alignment. The cross plate 46 is provided with an inwardly extending flange 51 along its upper edge, and such flange is adapted to overlie the end plate 47 of the main frame 17 to limit downward movement of the auxiliary frame relative to the main frame. As illustrated a support brace 52 is welded or otherwise connected at one end to the cross member 44 and the opposite end is welded or otherwise connected to the upper surface of the auxiliary frame 38.

In order to raise the auxiliary frame 38 after the pin 50 has been removed, a fluid cylinder 55 is swingably connected at one end by a pin 56 to a pair of lugs 57 welded or otherwise attached to the upper surface of the main frame 17. The fluid cylinder 55 is provided with a piston rod 58, the outer end of which is connected by a pin 59 to a pair of lugs 60 mounted on a cross member 61 carried by the first pair of arms 42. Fluid under pressure from the hydraulic system of the vehicle is introduced into and removed from the fluid cylinder 55 by fluid lines 62 and 63 to swing the bridge 41 and the auxiliary frame 37 about the pivot 43.

If desired a pair of upstanding lugs 64 can be mounted on the upper surface of the main frame 17 in spaced relation to the base plate 39 and such upstanding lugs may have openings 65 extending therethrough. A cooperating lug 66 extends outwardly from the cross member 44 and is provided with an opening 67 so that when the auxiliary frame 38 is pivoted about the pins 43 the cross member 44 will engage the upstanding lugs 64 in such a manner that the openings 65 and 67 are in alignment with each other to receive a pin and lock the auxiliary frame in raised position without relying upon the hydraulic system of the vehicle.

As illustrated in FIGS. 1-3 and 6, an outrigger indicated generally at 70 can be mounted on the outer end of the auxiliary frame 38 and provided with means for marking the earth to provide a guide for the operator of the vehicle so that the outermost implement on one pass through the field will be spaced a predetermined distance from the path of the outermost implement on the previous pass through the field. The outrigger 70 includes a base 71 mounted on the outer end of the tool bar 21 in any desired manner, as by brackets 72. A pair of side members 73 are pivotally mounted by pins 74 to the base 71 and the outer ends of such side members are welded or otherwise attached to a sleeve 75 connected to a central member 76. The sleeve 75 and central member 76 adjustably telescopically receive a square shaft 77 on the outer end of which is mounted a marker wheel 78.

In order to raise and lower the outrigger 70, a fluid cylinder 80 is pivotally mounted at one end by a pin 81 to a pair of lugs 82 projecting outwardly from the base 71. Such fluid cylinder is provided with a piston rod 83 the outer end of which is connected to a yoke-type connecting member 84 which is pivotally connected by a pin 85 to a depending lug 86 fixed to the central member 76. Extension and retraction of the piston rod 83 will cause the outrigger 70 to pivot about the pins 74 and raise and lower the outrigger relative to the auxiliary frame 38. In order to support the outrigger in folded inoperative position, a brace 87 is provided having one end fixed to the central member 76 in spaced relation to the base 71 and the opposite end of such brace is adapted to abut the base 71 when the outrigger 70 is moved to inoperative position.

With reference to FIG. 10, each of the fluid cylinders 55, for raising and lowering the auxiliary frames 38, is connected to a distributor valve 88 having an operating handle 89 convenient to the operator of the vehicle so that the operator can raise and lower the auxiliary frames 38 either independently or simultaneously. The fluid cylinders 80 likewise are provided with distributor valves 90 having operating handles 91 which are operated independently so that one of the outriggers can be in lowered position while the other outrigger is in raised position.

In the operation of the device, the gauge wheel assembly 25 is adjusted to regulate the height of the main frame 17 in accordance with the size of the implements carried by the tool bars 21. When the vehicle is in position, the auxiliary frames 38 are lowered so that the cross plates 46 are in engagement with the end plates 47 and the flanges 51 are engaged with the upper surface of the main frame 17, after which the pin 50 can be inserted if desired to lock the frames in co-extensive relationship. After the main and auxiliary frames are in alignment, one of the outriggers 70 will be lowered into position and thereafter the main frame 17 will be lowered by the mast-type hitch until the implements carried by the tool bars are in engagement with the ground. The operator of the vehicle then steers the vehicle across the field. At the opposite end of the field the main frame is raised so that the implements are out of engagement with the ground to permit the operator to reverse the direction of travel of the vehicle and simultaneously raise the outrigger which had been lowered, and lower the outrigger which had been raised. Thereafter, the main frame again is lowered so that the implements are in engagement with the ground and the operator drives across the field again using the mark made by the marker wheel 78 as a guide so that the rows will be equally spaced. At the completion of the work being done, the operating handles 89 are operated to raise the auxiliary frames 38 to the position shown in FIG. 3 at which time the implements carried by the auxiliary frames will be substantially in alignment with the outer ends of the main frame 17 so that the over-all width of the device is substantially equal to the length of the main frame.

I claim

1. An implement carrier comprising an elongated main frame having opposite ends, means intermediate said ends for connecting said main frame to a propelling vehicle, pivotal connecting means spaced inwardly from at least one of the ends of said main frame, bridge means connected to said pivotal connecting means and extending outwardly of said one end of said main frame, an auxiliary frame fixed to the outer end of said bridge means, means for swinging said bridge means in a generally vertical plane about said pivotal connecting means to selectively move said auxiliary frame to operative or inoperative positions, said auxiliary frame having an end which abuts said one end of said main frame when said auxiliary frame is in operative position, an abutment on said main frame and spaced from said pivotal connecting means, a portion of said bridge means engaging said abutment to resist horizontal movement of said auxiliary frame and reduce shear forces on said pivotal connecting means when said auxiliary frame is in operative position, and means for mounting at least one implement on each of said main and auxiliary frames, whereby said auxiliary frame is substantially co-extensive with said main frame in operative position and disposed inwardly of the end of said main frame in inoperative position.

2. The structure of claim 1 including means for locking said auxiliary frame to said main frame when said frames are in abutting relationship.

3. The structure of claim 1 in which said abutment is the forward portion of said main frame.

* * * * *